Patented June 30, 1925.

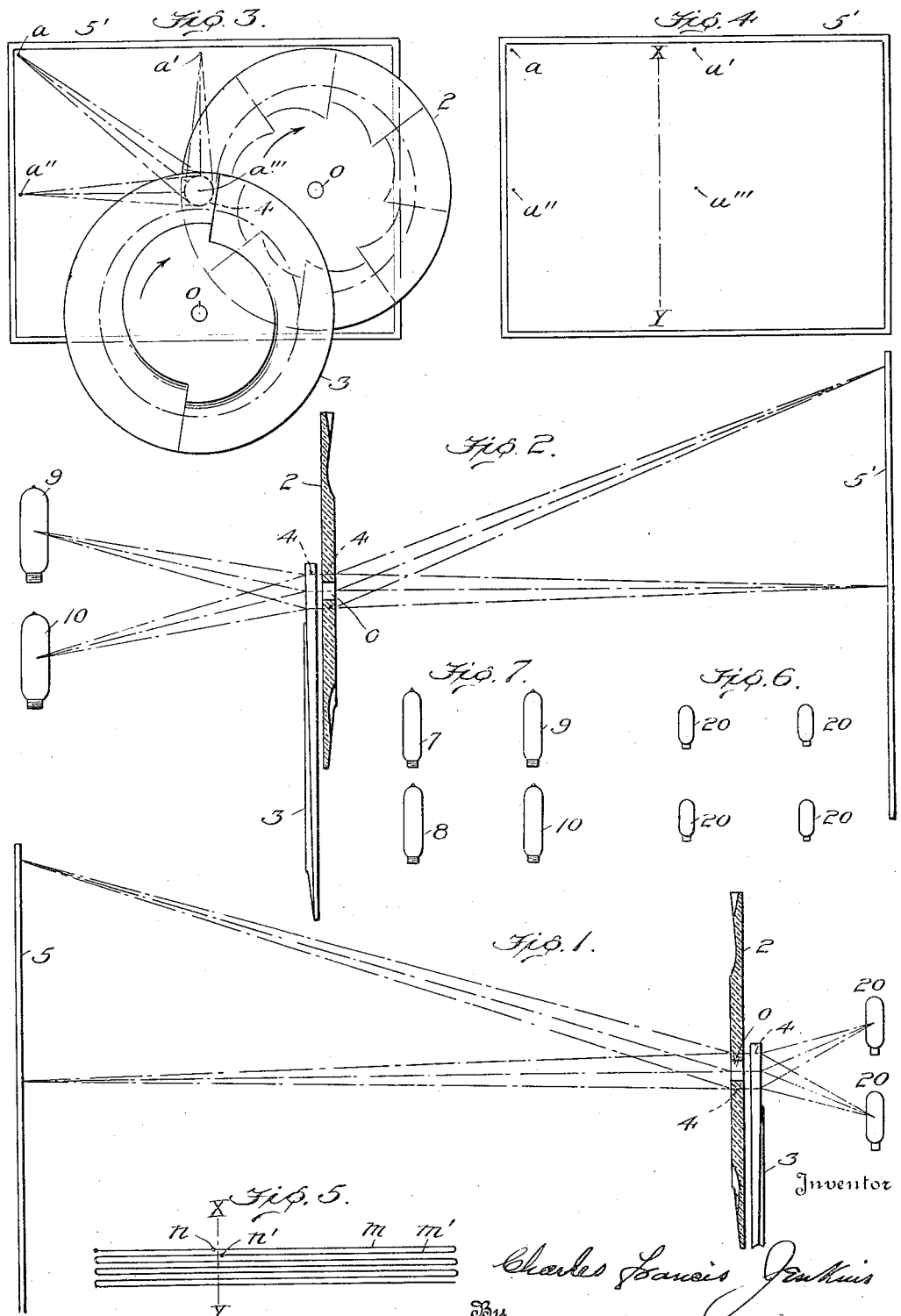

1,544,158

UNITED STATES PATENT OFFICE.

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION.

WIRELESS BROADCASTING OF PICTURES.

Application filed September 11, 1922. Serial No. 587,507.

*To all whom it may concern:*

Be it known that I, CHARLES FRANCIS JENKINS, a citizen of the United States, and resident of Washington, in the District of Columbia, have invented certain new and useful Improvements in Wireless Broadcasting of Pictures, of which the following is a specification, reference being had therein to the accompanying drawing.

This invention relates to wireless transmission, or broadcasting, of motion and other pictures, and among its objects are eliminating blurring and distortion through lack of perfect synchronism in the sending and receiving sets, and to reduce largely the travel of light beams which are used.

Heretofore, so far as I am aware, methods employed for covering a picture surface have involved the use of either rotating drum; a mirror so moved that a ray from its surface moves spirally over the picture area; or a mirror arranged to carry a reflected ray back and forth over the picture surface, the paths followed in moving in one direction being at a very short distance from the paths followed when the ray is moving in the contrary direction.

Obviously the rotating drums are not usable where plane surfaces are involved, and the two mirror-methods, so far as I know, are the only ones heretofore proposed for flat surfaces. Each has the practically fatal fault that entirely exact synchronism of the sending and receiving sets is indispensable to clear and sharp reproduction, for example, let it be supposed that a sharp vertical line is to be transmitted and that it should appear as such on a distant receiving surface.

To illustrate the method and apparatus for producing this transmission of a simple form, diagrammatic views are shown in my application Ser. No. 543,331, and in the accompanying drawings, in which Fig. 1 shows the transmitting devices partly in plan, partly in section; Fig. 2 shows the receiving devices in an analogous way; Fig. 3 is a face view of the two prism plates and a screen more distant from the observer; Fig. 4 is a face view of that part of the screen upon which the picture is to be produced; Fig. 5 illustrates certain possible imperfections if different devices are used; Fig. 6 shows the relative positions of four light-sensitive electric cells at the sending station, and Fig. 7 shows in like manner four lamps at the receiving station.

In these views, 2 and 3 represent two overlapped prism discs, 4 the place where the light pencil passes through the peripheral prismatic margins of the discs. 5 designates a screen bearing a picture, represented, in this instance, in Fig. 4, as a straight vertical line, X—Y, 7 a known form of photoelectric cell upon the light-sensitive element of which the lens directs the light passing through the prisms at 4. For illustration one disc is shown as peripherally divided into eight prism sectors, while the other is divided into two sectors, one disc tending to deflect the light beam horizontally while the other deflects the beam vertically. As each prism sector passes the point 4 it receives light successively from a series of points beginning at one side of the picture and extending to the opposite side, the amount of light varying with the intensity of illumination at the point whence the light comes from the object or picture.

This light always falls at practically the same point on the cell, since the ray varies in deflection with the variation of the prism sector. This apparatus is similar to apparatus set forth in a pending application Ser. No. 543,331, but the present method goes beyond the disclosure in that application, and certain broad claims are made here instead of in that application.

Were a beam of light passed alternately in opposite directions across the picture field, the presence of the vertical line X—Y, before mentioned would cause the reproduction of a similar sharp line on a distant receiving screen, provided that the sending and receiving sets were in exact synchronism, but not otherwise. For if the receiving set lagged, each point which should be in the line X—Y would be a little at one side of the line (Fig. 5), while on the return of the beam, the like lag would place the corresponding point on the opposite side of the position designated by X—Y. We should, therefore, have two lines if the lagging were great enough and the points were so close in each row as to give continuous lines.

Practically, however, we should have slight offsetting and a single blurred line.

What happens as to the points in the line also happens for every point in a picture, and only a very poor picture is transmitted.

If, on the other hand, the light beam always travels laterally in one direction only, the offsetting will always be in one direction only, and there will be no blurring but the picture will be simply displaced slightly from its intended position, a matter of no practical moment.

To avoid this evil, the picture area may be supposed to be divided into, for example, four quarters by a vertical line and a horizontal line, and then arranging four cells 20, 20 to transmit fluctuating currents from the four points of the four upper left hand corners of the quarters, so that as the discs rotate, the light points travel simultaneously, each passing repeatedly from left to right across its quarter, precisely as, in the case first described, it passed over the whole area. The speed and time are thus divided, and in accordance with the number of parts into which it has been determined to divide the area.

When the picture area is thus divided into four parts, four lights are so located at a receiving station that a pencil from each passes through the same overlapping portions of the rotary prism discs, or rings, but as these pencils strike the discs at different angles, they are differently bent, and they are so adjusted that the four occupy nearly corresponding places on the four segments of the picture area, so, initially each lies preferably in the upper left hand corner of the corresponding segment, the pencil in the upper right hand quarter being at the point where the first or upper path of the pencil crossing the upper left hand quarter ends. The pencils in the lower quarters are similarly arranged. As, at the receiving station, the prisms rotate, each of the four pencils travels repeatedly across its segment in the manner already described, so that the entire area is covered by the pencil paths as before, but the speed is divided by four.

The devices set forth are adapted to transmit and reproduce any figure within the focus of a universal lens, even figures at materially different distances from the lens, so that pictures of actually moving figures or persons on any part of a stage, for example, may be transmitted.

What I claim is—

1. The method of simultaneously scanning a plurality of sections of a picture area by pencils of light, each of said sections being covered by a plurality of lines from a corresponding light pencil.

2. The method of dividing a picture area into a plurality of sections and of scanning each of these sections simultaneously by pencils of light, each section being covered by parallel lines from a corresponding light pencil.

3. The method of intensifying the illumination of a radio picture which consists in simultaneously scanning a plurality of sections of a picture area with a plurality of pencils of light, one pencil for each section of said area, and each pencil of light traversing a section in a plurality of parallel uni-directional lines.

4. The combination of two revolubly mounted overlapping prismatic rings having a diameter of each at right angles to a diameter of the other at a point where a beam of light passes through both rings.

5. The combination of two revolubly mounted prismatic rings having a diameter of each at right angles to a diameter of the other at a point where a beam of light passes through both rings, and means for simultaneously rotating said rings at different speeds.

6. In a device of the class described, the combination with a revolubly mounted prismatic ring adapted to deflect a beam of light in one direction, of a second revolubly mounted prismatic ring overlapping the first, and adapted to deflect a beam of light at approximately right angles to the direction in which the first ring deflected said beam, and means for simultaneously rotating said prismatic rings at different speeds.

In testimony whereof I hereunto affix my signature.

CHARLES FRANCIS JENKINS.